(12) United States Patent
Robinson

(10) Patent No.: US 10,833,491 B2
(45) Date of Patent: *Nov. 10, 2020

(54) AUTOMATIC CIRCUIT BREAKER PAN INTERLOCK

(71) Applicant: Eaton Intelligent Power Limited, Dublin (IE)

(72) Inventor: James Darryl Robinson, Greenwood, SC (US)

(73) Assignee: Eaton Intelligent Power Limited, Dublin (IE)

(*) Notice: Subject to any disclaimer, the term of this patent is extended or adjusted under 35 U.S.C. 154(b) by 0 days.

This patent is subject to a terminal disclaimer.

(21) Appl. No.: 16/504,626

(22) Filed: Jul. 8, 2019

(65) Prior Publication Data

US 2019/0334327 A1 Oct. 31, 2019

Related U.S. Application Data

(63) Continuation of application No. 15/685,210, filed on Aug. 24, 2017, now Pat. No. 10,348,066.

(Continued)

(51) Int. Cl.
*H01H 71/12* (2006.01)
*H02B 11/133* (2006.01)
(Continued)

(52) U.S. Cl.
CPC ....... *H02B 11/133* (2013.01); *H01H 71/0264* (2013.01); *H01H 71/126* (2013.01);
(Continued)

(58) Field of Classification Search
CPC ...... H02B 11/04; H02B 11/12; H02B 13/025; H02B 1/36; H02B 11/133; H02B 11/127;
(Continued)

(56) References Cited

U.S. PATENT DOCUMENTS 2,921,998 A * 1/1960 Pokorny ............. H02B 11/133
200/50.26
6,590,170 B1 * 7/2003 Jenkins ............... H02B 11/127
200/50.21

(Continued)

*Primary Examiner* — Ahmed M Saeed
(74) *Attorney, Agent, or Firm* — Benesch, Friedlander, Coplan & Aronoff LLP

(57) ABSTRACT

An apparatus includes a cell pan that supports a circuit breaker within a switchgear cell, and a lift pan that carries a circuit breaker outside of the switchgear cell. The lift pan has a track for a roller on the circuit breaker. The apparatus further includes an extension rail that interconnects the lift pan with the cell pan in an aligned position. With the lift pan in aligned position, the track on the lift pan can receive the roller upon horizontal draw-out movement of the circuit breaker from the cell pan. A latch on the extension rail has a blocking position in which it blocks the roller from rolling outward off the cell pan, and has a non-blocking position in which it does not block the roller from rolling outward off the cell pan. The latch automatically moves from the blocking position to the non-blocking position under the influence of the lift pan upon movement of the lift pan into the aligned position.

20 Claims, 3 Drawing Sheets

Related U.S. Application Data

(60) Provisional application No. 62/518,690, filed on Jun. 13, 2017.

(51) Int. Cl.
*H01H 71/02* (2006.01)
*H01H 73/06* (2006.01)
*H02B 1/04* (2006.01)
*H01H 9/20* (2006.01)

(52) U.S. Cl.
CPC .............. *H01H 73/06* (2013.01); *H01H 9/20* (2013.01); *H02B 1/04* (2013.01)

(58) Field of Classification Search
CPC . H02B 11/00; H02B 1/30; H02B 1/04; H01H 71/126; H01H 73/06; H01H 71/0264; H01H 9/20
USPC ......... 200/50.21, 50.22, 50.23, 50.24, 50.25, 200/50.26, 502, 50.01, 50.05, 50.27; 361/609, 606, 605, 607, 617
See application file for complete search history.

(56) References Cited

U.S. PATENT DOCUMENTS

| | | | | |
|---|---|---|---|---|
| 7,057,123 B1* | 6/2006 | Jenkins | ................ | H02B 11/133 |
| | | | | 200/50.23 |
| 9,397,487 B2* | 7/2016 | Sims | ....................... | E05B 65/46 |
| 10,348,066 B2* | 7/2019 | Robinson | ........... | H01H 71/0264 |
| 2008/0078659 A1* | 4/2008 | Parker | ................. | H02B 11/127 |
| | | | | 200/50.21 |

\* cited by examiner

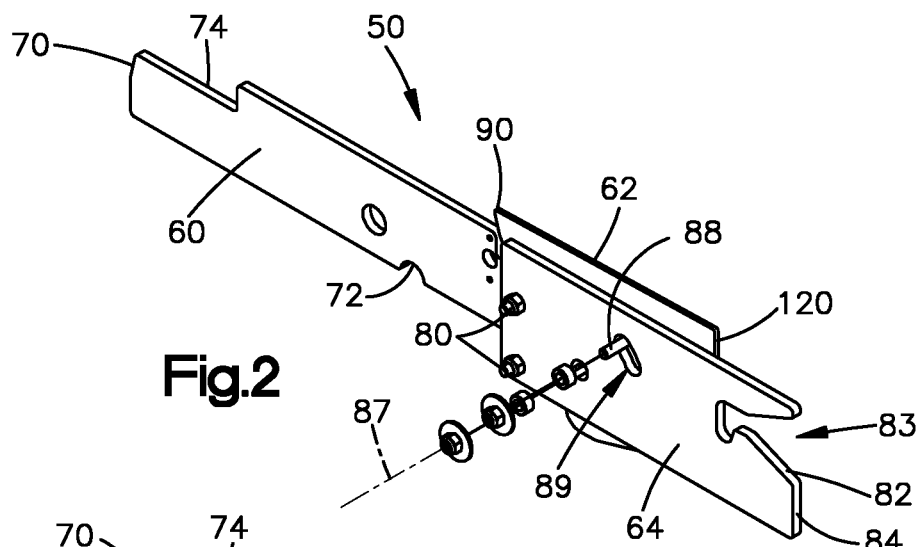
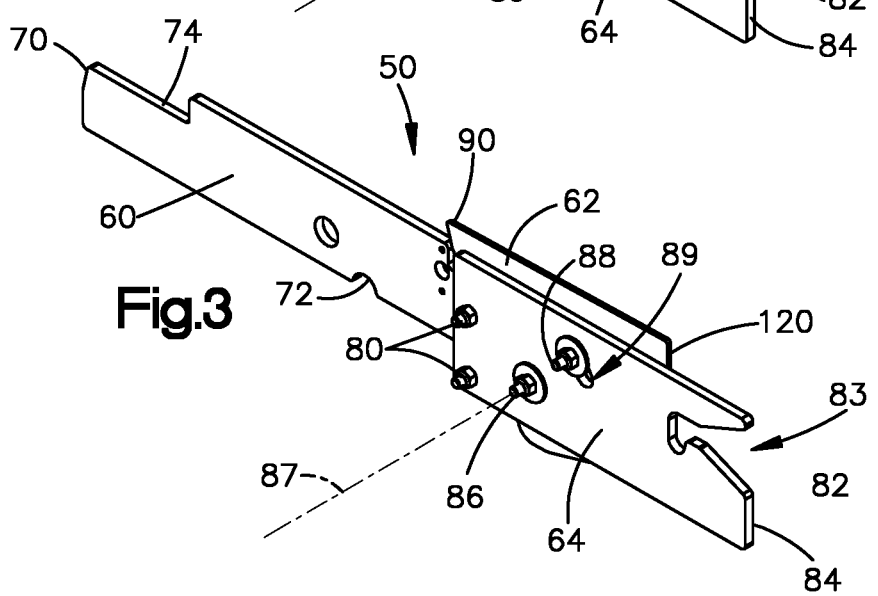
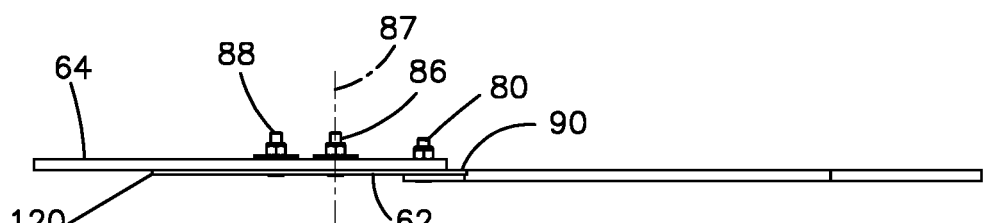
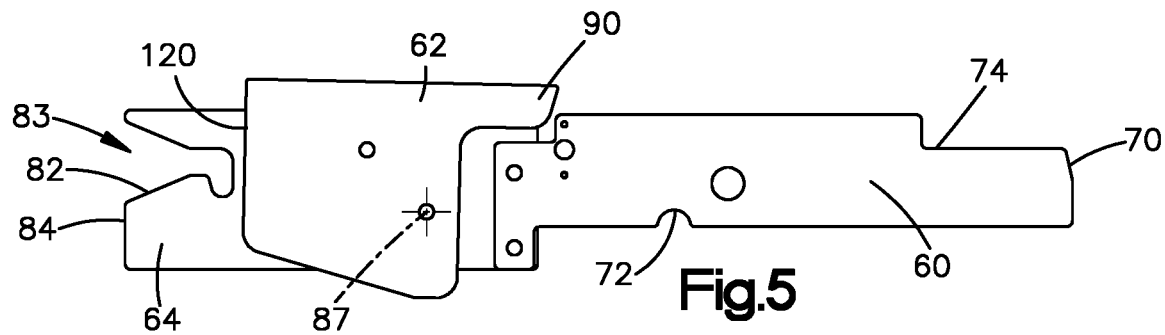

AUTOMATIC CIRCUIT BREAKER PAN INTERLOCK

RELATED APPLICATIONS

This application is a continuation of U.S. patent applicant Ser. No. 15/685,210, filed on Aug. 24, 2017, which claims priority of provisional U.S. Patent Application 62/518,690, filed Jun. 13, 2017, which is incorporated by reference.

TECHNICAL FIELD

This technology includes a cell pan for supporting a horizontal draw-out circuit breaker in a switchgear cell, and further includes a mechanism for blocking draw-out movement of the circuit breaker from the cell pan.

BACKGROUND

A horizontal draw-out circuit breaker is operatively installed within a switchgear cell. The switchgear cell contains a cell pan with rails. The circuit breaker has rollers for moving into and out of the switchgear cell along the rails. A lift pan is provided to carry the circuit breaker on a lifting device that can be rolled across a floor to transport the circuit breaker to and from the switchgear cell. When the lift pan is moved into alignment with the cell pan, the circuit breaker can be withdrawn from the switchgear cell by rolling the circuit breaker outward from the cell pan onto the lift pan. The cell pan is equipped with latches that normally retain the circuit breaker within the switchgear cell by blocking the rollers from rolling off the cell pan. When the latches on the cell pan are disengaged, the circuit breaker is free to roll outward off the cell pan.

SUMMARY

An apparatus is configured for use with a circuit breaker, a cell pan that supports the circuit breaker in a switchgear cell, and rollers that support the circuit breaker on the cell pan for horizontal draw-out movement from the cell pan. The apparatus includes a lift pan that carries the circuit breaker outside of the switchgear cell. The lift pan has a track for a roller on the circuit breaker. The apparatus further includes an extension rail that interconnects the lift pan with the cell pan in an aligned position. With the lift pan in aligned position, the track on the lift pan can receive the roller upon horizontal draw-out movement of the circuit breaker from the cell pan. A latch is supported on the extension rail for movement relative to the extension rail. The latch has a blocking position in which it blocks the roller from rolling outward off the cell pan, and has a non-blocking position in which it does not block the roller from rolling outward off the cell pan. The latch automatically moves from the blocking position to the non-blocking position under the influence of the lift pan upon movement of the lift pan into the aligned position.

BRIEF DESCRIPTION OF THE DRAWINGS

FIG. 2 is an enlarged perspective view of parts shown in FIG. 1.

FIG. 3 is a view similar to FIG. 2, showing fasteners interconnecting the parts.

FIG. 4 is top view of the parts as shown in FIG. 3.

FIG. 5 is an opposite side view of the parts shown in FIG. 2.

DETAILED DESCRIPTION

Figure 1:
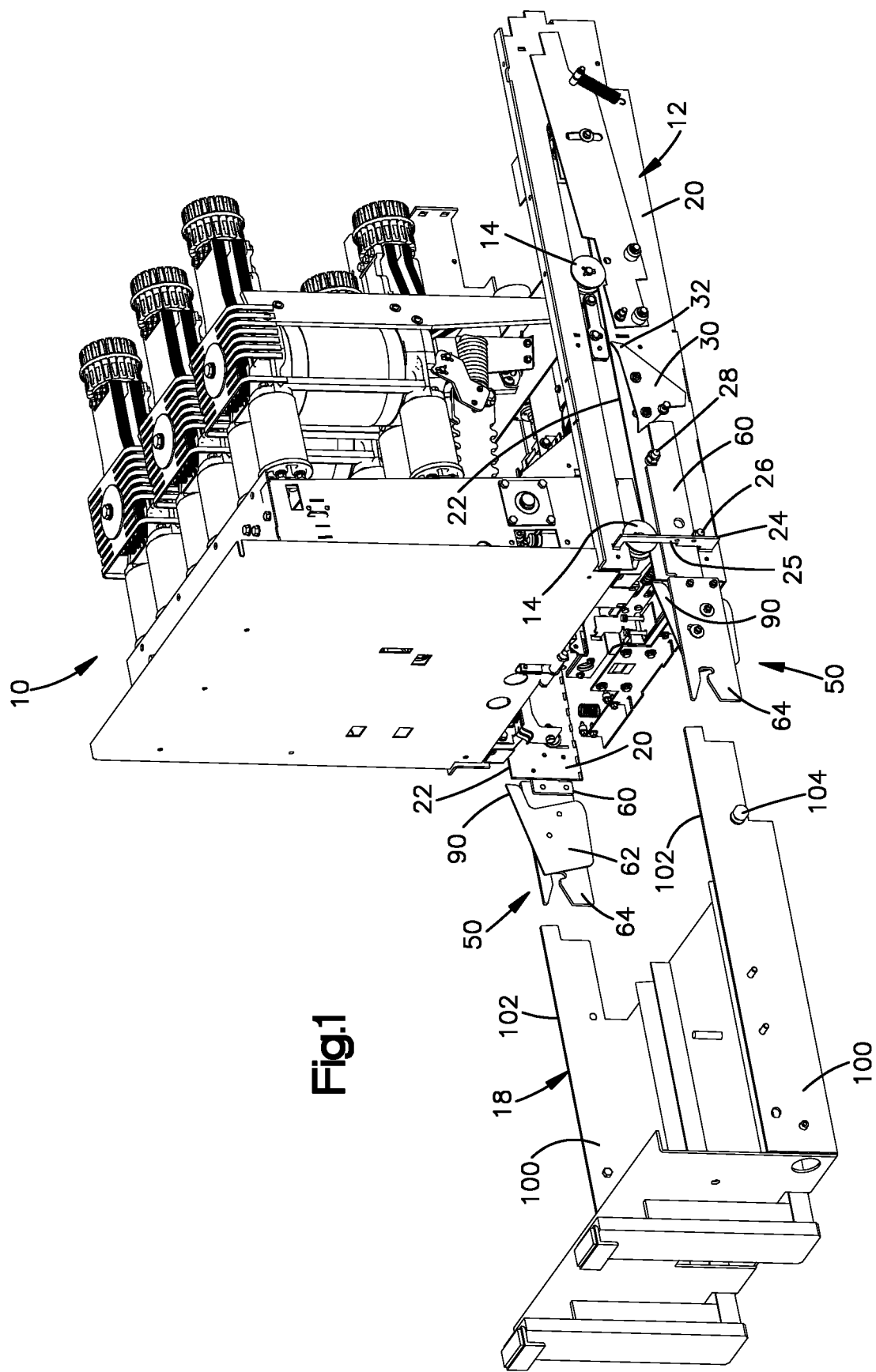
FIG. 1 is a perspective view of a circuit breaker with other parts and assemblies for providing and controlling horizontal draw-out movement of the circuit breaker.

The structures illustrated in the drawings include examples of the elements recited in the claims. The illustrated structures thus include examples of how a person of ordinary skill in the art can make and use the claimed invention. These examples are described to meet the enablement and best mode requirements of the patent statute without imposing limitations that are not recited in the claims. One or more of the elements of one embodiment may be used in combination with, or as a substitute for, one or more elements of another as needed for any particular implementation of the invention.

As shown in FIG. 1, an apparatus includes a circuit breaker 10 and a cell pan 12. The cell pan 12 is configured to support the circuit breaker 10 in a position operatively installed within a switchgear cell (not shown), as known in the art. Rollers 14 support the circuit breaker 10 on the cell pan 12 for horizontal draw-out movement from the cell pan 12 in a direction from left to right as viewed in FIG. 1. The apparatus further includes a lift pan 18 that is configured to carry the circuit breaker 10 on a lifting device (not shown) which, as known in the art, can be rolled across a floor to transport the circuit breaker 10 to and from the switchgear cell.

The cell pan 12 has a pair of opposite side rails 20. Each side rail 20 has an upper edge 22 defining a track for the rollers 14 at the corresponding side of the circuit breaker 10. A frame 24 at each side rail 20 defines a slot 25. A hub 26 projects from the side rail 20 at a location slightly inward of the frame 24. A stop member 28 projects from the side rail 20 at a location spaced inward from the hub 26. Additionally, a latch 30 is mounted on the side rail 20 for rotation on the side rail 20. The latch 30 normally takes a raised position in which an inner corner portion 32 of the latch 30 projects upward into the path of movement of the rollers 14 along the upper edge 22. In this manner the latch 30 normally blocks the circuit breaker 10 from rolling outward off the cell pan 12.

Also shown in FIG. 1 are a pair of extension rail assemblies 50. The extension rail assemblies 50 are configured to interconnect the lift pan 18 with cell pan 12 in an aligned position in which the circuit breaker 10 can roll outward from the cell pan 12 onto the lift pan 18. The extension rail assemblies 50 are further configured to block the circuit breaker 10 from rolling outward off the cell pan 12 when the lift pan 18 is not interconnected in the aligned position. As shown in FIG. 1, the extension rail assemblies 50 are oriented oppositely relative to each other at opposite sides of the apparatus, but are otherwise alike. Each extension rail assembly 50 thus includes an extension rail 60, a latch 62, and a lock plate 64.

As shown in greater detail in FIGS. 2-5, each extension rail 60 has an inner end 70, a lower notch 72, and an upper shoulder 74 between the lower notch 72 and the inner end 70. In this configuration, the extension rails 60 can be releasably installed at the side rails 20 on the cell pan 12, as shown in FIG. 1. Specifically, an extension rail is 60 inserted through the slot 25 at the frame 24 on the corresponding side rail 20. The lower notch 72 is received on the hub 24. The extension rail 60 can then be rotated about the hub 24 to move the upper shoulder 74 against the stop member 28. This causes the inner end 70 of the extension rail 60 to move upward against the latch 30, and thereby to rotate the latch 30 from the raised position to a lowered position, as shown in FIG. 1.

When the latch 30 is in the lowered position of FIG. 1, it no longer blocks the rollers 14 on the upper edge 22 of the side rail 20. However, as noted above, the extension rail assemblies 50 block the circuit breaker 10 from rolling outward off the cell pan 12 when the lift pan 18 is not interlocked in the aligned position. This is accomplished by the latches 62 and the lock plates 64.

Referring again to FIGS. 2-5, each lock plate 64 is fixed to the respective extension rail 60 by fasteners 80. An inner edge 82 of the lock plate 64 defines a J-hook slot 83 reaching inward from an outer end 84 of the lock plate 64. Each latch 62 is supported on the respective lock plate 64 by a hub 86 at which the latch 62 is movable relative to the lock plate 64 pivotally about an axis 87. A stop member 88 projects from the latch 62 through an arcuate slot 89 in the lock plate 64 to define a range of pivotal movement along the length of the slot 89.

When the extension rail assemblies 50 are installed on the cell pan 12 as described above with reference to FIG. 1, the latches 62 on the extension rail assemblies 50 normally take positions in which an inner corner portion 90 of each latch 62 projects upward beyond the upper edge 22 of the adjacent side rail 20 on the cell pan 12. The latches 62 then block the rollers 14 from rolling outward off the cell pan 12. In the illustrated example, the hubs 86 are located relative to the latches 62 such that each latch 62 is normally retained in the blocking position by the force of gravity urging the latch 62 pivotally about the respective axis 87 toward and into the blocking position.

Figure 6:
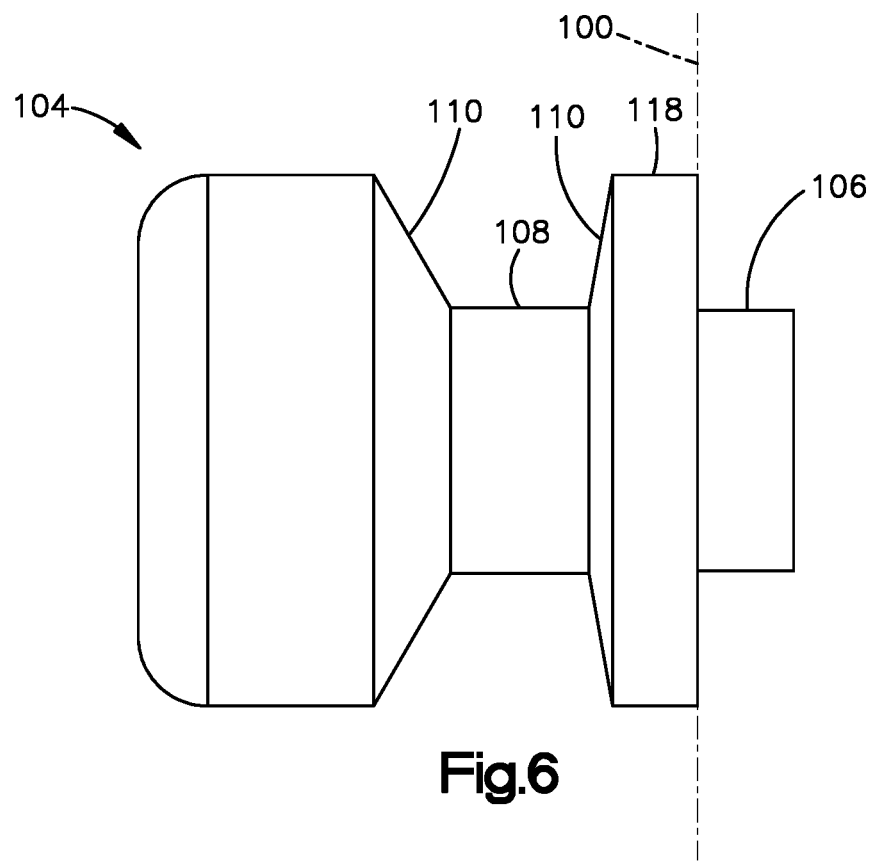
FIG. 6 is an enlarged side view of other another part shown in FIG. 1.
Figure 7:
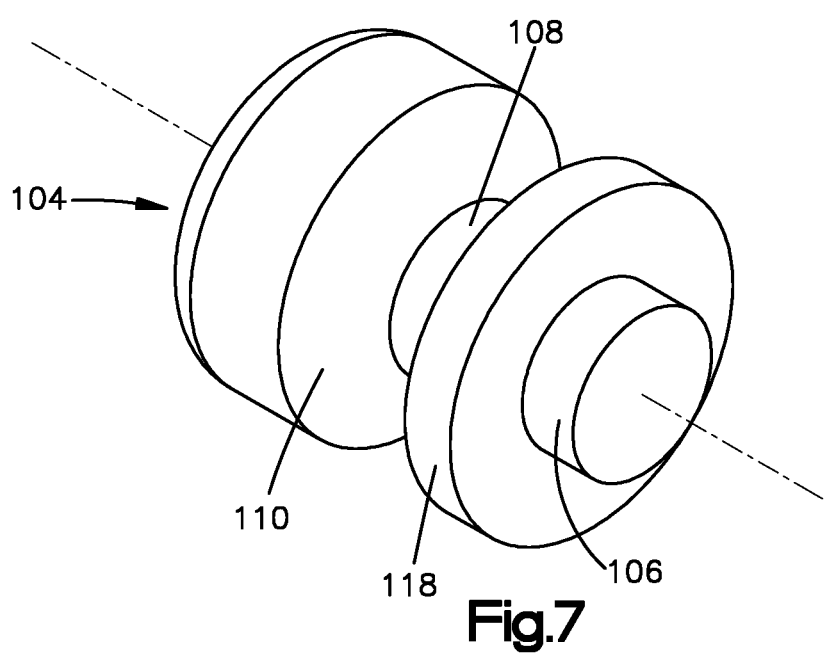
FIG. 7 is a perspective of the part shown in FIG. 6.

The lift pan 18 has a pair of opposite side rails 100. Each side rail 100 has an upper edge 102 defining a track for the rollers 14 at the corresponding side of the circuit breaker 10. Each side rail 100 also has a laterally projecting rail guide 104. Each rail guide 104 has a weld boss 106 (FIGS. 6 and 7) at which the rail guide 104 is welded to the respective side rail 100.

As noted above, the lift pan 18 is carried on a lifting device, and is movable from the position of FIG. 1 into engagement with the extension rail assemblies 50. As the lift pan 18 approaches the extension rail assemblies 50, central portions 108 of the rail guides 104 are received in the J-hook slots 83 in the lock plates 64. Conical surfaces 110 at opposite ends of the central portions 108 can slide against the inner edge surfaces 82 of the lock plates 64 within the J-hook slots 83 as needed to guide the side rails 100 on the lift pan 18 into alignment with the side rails 20 on the cell pan 12. The lift pan 18 is thereby aligned with the cell pan 12 so as to receive the rollers 14 upon horizontal draw-out movement of the circuit breaker 10 outward from the cell pan 12. The lift pan 18 becomes releasably interconnected with the extension rail assemblies 50 in the aligned position when the central portion 108 of each rail guide 104 reaches the bottom of the corresponding J-hook slot 83.

In addition to establishing an interlock between the lift pan 18 and the lock plates 64, the rail guides 104 on the lift pan 18 push against the latches 62 to move the latches 62 pivotally about the axes 87. As the central portions 108 of the rail guides 104 move through the J-hook slots 83, enlarged end portions 118 of the rail guides 104 contact and advance inwardly against outer edges 120 of the latches 62. This pivots the latches 62 so as to move the corner portions 90 downward to positions in which they do not block the rollers 14 from rolling outward off the side rails 20. The circuit breaker 10 is thus released for removal from the cell pan 12 automatically by the action of interlocking the lift pan 18 with the extension rail assemblies 50. When the lift pan 18 is subsequently disconnected by removing the rail guides 104 from the J-hook slots 83, the latches 62 return pivotally back into their locking positions under the force of gravity.

This written description sets for the best mode of carrying out the invention, and describes the invention so as to enable a person of ordinary skill in the art to make and use the invention, by presenting examples of the elements recited in the claims. The detailed descriptions of those elements do not impose limitations that are not recited in the claims, either literally or under the doctrine of equivalents.

The invention claimed is:

1. An apparatus for use with a circuit breaker and a cell pan configured to support the circuit breaker in a switchgear cell, the cell pan having a cell pan track for horizontal draw-out movement of the circuit breaker, the apparatus comprising:

a lift pan configured to carry the circuit breaker outside of the switchgear cell, the lift pan having a lift pan track for horizontal draw-out movement of the circuit breaker;

an extension rail configured to interconnect the lift pan with the cell pan in an aligned position for the lift pan track to receive the circuit breaker from the cell pan track;

a latch supported on the extension rail for movement relative to the extension rail between a blocking position where the latch blocks horizontal draw-out movement of the circuit breaker on the cell pan track and a non-blocking position where the latch does not block horizontal draw-out movement of the circuit breaker on the cell pan track, and the latch is held in the blocking position by the lift pan when the lift pan is in the aligned position; and interconnecting means for releasably interconnecting the lift pan with the extension rail in response to movement of the lift pan into the aligned position.

2. An apparatus as defined in claim 1 wherein the latch is supported on the extension rail to move from the non-blocking position to the blocking position under the force of gravity.

3. An apparatus as defined in claim 1 wherein the latch is supported on the extension rail to normally remain in the blocking position under the force of gravity.

4. An apparatus as defined in claim 1 wherein the latch is supported on the extension rail for movement between the blocking position and the non-blocking position pivotally about an axis.

5. An apparatus as defined in claim 1 wherein the latch is supported on the extension rail to be moved into the blocking position by advancing contact of the lift pan.

6. An apparatus as defined in claim 1 wherein the lift pan has a guide member, and the extension rail has a slot configured to receive the guide member upon movement of the lift pan toward the aligned position.

7. An apparatus as defined in claim 6 wherein the guide member is movable against the latch to move the latch into the blocking position upon movement of the guide member in the slot.

8. An apparatus as defined in claim 6 wherein the interconnecting means includes the guide member on the lift pan and the slot in the extension rail, the slot is a J-hook slot having a bottom, and the interconnecting means releasably interconnects the lift pan with the extension rail upon movement of the guide member to the bottom of the J-hook slot.

9. An apparatus for use with a circuit breaker and a cell pan configured to support the circuit breaker in a switchgear cell, the cell pan having a cell pan track for horizontal draw-out movement of the circuit breaker, the apparatus comprising:
 a lift pan configured to carry the circuit breaker outside of the switchgear cell, the lift pan having a lift pan track for horizontal draw-out movement of the circuit breaker;
 an extension rail configured to interconnect the lift pan with the cell pan in an aligned position for the lift pan track to receive the circuit breaker from the cell pan track; and
 a latch supported on the extension rail for movement relative to the extension rail between a blocking position where the latch blocks horizontal draw-out movement of the circuit breaker on the cell pan track and a non-blocking position in where the latch does not block horizontal draw-out movement of the circuit breaker on the cell pan track, and the latch is held in the non-blocking position by the lift pan in the aligned position;
 wherein the latch is supported on the extension rail to return from the non-blocking position to the blocking position under the force of gravity.

10. An apparatus as defined in claim 9 wherein the latch is supported on the extension rail to normally remain in the blocking position under the force of gravity.

11. An apparatus as defined in claim 9 wherein the latch is supported on the extension rail for movement between the blocking position and the non-blocking position pivotally about an axis.

12. An apparatus as defined in claim 9 wherein the lift pan has a guide member, and the extension rail has a slot configured to receive the guide member.

13. An apparatus as defined in claim 12 wherein the guide member is movable against the latch to move the latch into the blocking position upon movement of the guide member in the slot.

14. An apparatus as defined in claim 12 wherein the slot is a J-hook slot.

15. An apparatus for use with a circuit breaker, comprising:
 a cell pan configured to support the circuit breaker in a switchgear cell, the cell pan having a cell pan track for horizontal draw-out movement of the circuit breaker;
 a first latch supported on the cell pan for movement between a blocking position where the first latch blocks horizontal draw-out movement of the circuit breaker on the cell pan track and a non-blocking position where the first latch does not block horizontal draw-out movement of the circuit breaker on the cell pan track;
 a lift pan configured to carry the circuit breaker outside of the switchgear cell, the lift pan having a lift pan track for horizontal draw-out movement of the circuit breaker;
 an extension rail configured to interconnect the lift pan with the cell pan in an aligned position for the lift pan track to receive the circuit breaker from the cell pan track, wherein the extension rail is configured for attachment to the cell pan track in an installed position where the extension rail supports the first latch in the non-blocking position; and
 a second latch supported on the extension rail for movement between a blocking position where the second latch blocks horizontal draw-out movement of the circuit breaker from the cell pan track onto the lift pan track and a non-blocking position where the latch does not block horizontal draw-out movement of the circuit breaker from the cell pan track onto the lift pan track, and the second latch is held in the blocking position by the lift pan when the lift pan is in the aligned position.

16. An apparatus as defined in claim 15 wherein the second latch is supported on the extension rail to move from the non-blocking position to the blocking position under the force of gravity.

17. An apparatus as defined in claim 15 wherein the second latch is supported on the extension rail to normally remain the blocking position under the force of gravity.

18. An apparatus as defined in claim 15 further comprising interconnecting means for releasably interconnecting the lift pan with the extension rail in response to movement of the lift pan into the aligned position.

19. An apparatus as defined in claim 15 wherein the lift pan has a guide member, the extension rail has a slot configured to receive the guide member upon movement of the lift pan toward the aligned position, and the guide member is movable against the latch to move the latch into the blocking position upon movement of the guide member in the slot.

20. An apparatus as defined in claim 19 wherein the interconnecting means includes the guide member on the lift pan and the slot in the extension rail, the slot is a J-hook slot having a bottom, and the interconnecting means releasably interconnects the lift pan with the extension rail upon movement of the guide member to the bottom of the J-hook slot.

\* \* \* \* \*